Dec. 14, 1971  J. BAKER  3,627,519
MANUFACTURE OF SHEETS OF SINTERED MATERIAL
Filed April 14, 1969  5 Sheets-Sheet 1

INVENTOR
JOHN BAKER
BY Brady, O'Boyle & Gates
ATTORNEYS

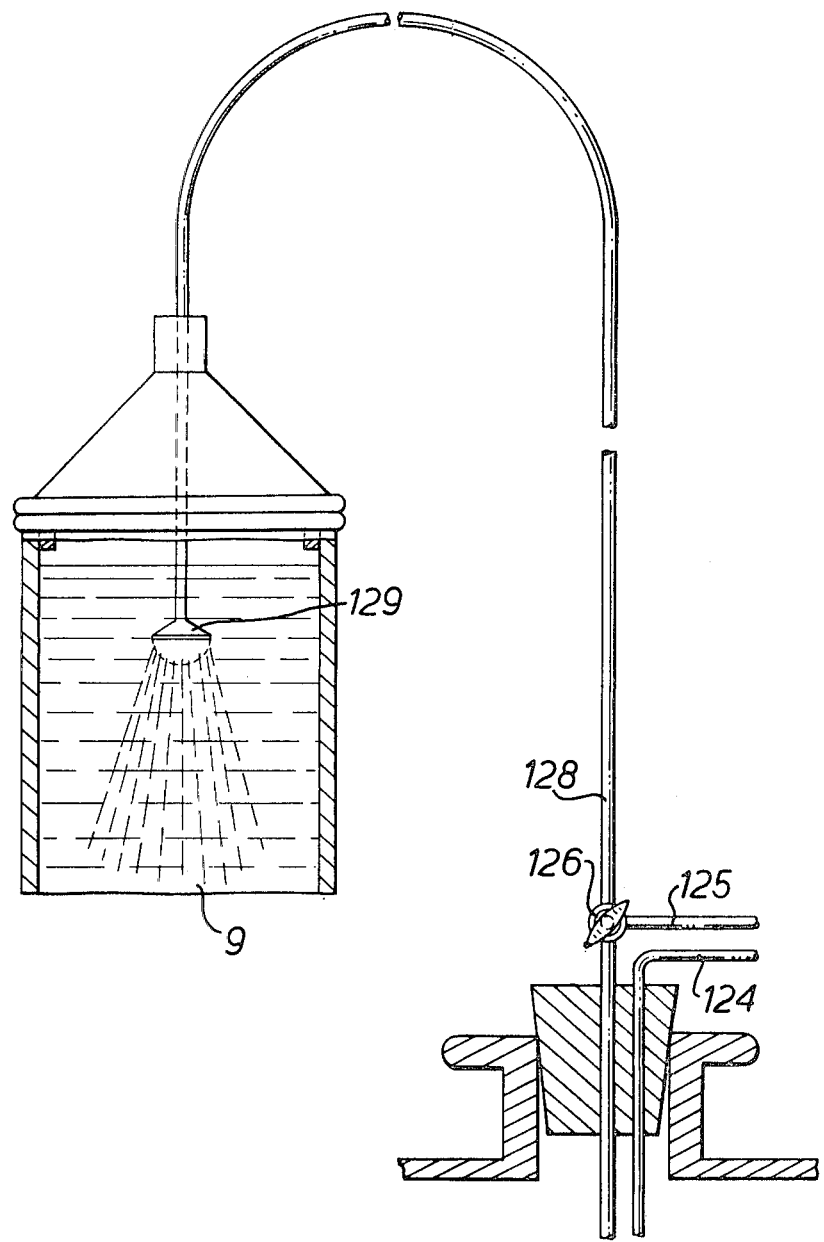

United States Patent Office 3,627,519
Patented Dec. 14, 1971

3,627,519
MANUFACTURE OF SHEETS OF SINTERED MATERIAL
John Baker, Bessacarr, near Doncaster, England, assignor to British Ropes Limited, Doncaster, Yorkshire, England
Filed Apr. 14, 1969, Ser. No. 815,888
Claims priority, application Great Britain, Apr. 16, 1968, 17,992/68
Int. Cl. B22f *3/16, 3/18*
U.S. Cl. 75—211                                         9 Claims

ABSTRACT OF THE DISCLOSURE

A method of and apparatus for manufacturing sheets of sintered material, which method includes the steps of forming a suspension of particles of sinterable material in a fluid, allowing particles to be deposited from the suspension to form a layer on a support, and sintering the particles in the layer to form a coherent sheet.

---

This invention is concerned with the manufacture of sheets of sintered material.

It is an object of the invention to provide an improved method of making such sheets.

According to the invention, a method of manufacturing sheets of sintered material includes the steps of forming a suspension of particles of sinterable material in a fluid, allowing particles to be deposited from the suspension to form a layer on a backing or support, and sintering the particles in the layer to form a coherent sheet.

The invention is particularly, but not exclusively, applicable to sinterable materials in the form of particles of elemental metals and/or metal oxides. However, the sinterable material may be any suitable material or mixture of material capable of existing in particulate form, which possesses a softening or fusion point, as distinct from a melting point, when subjected to heat and/or pressure in atmospheric or protected atmospheric conditions. Inorganic non-metallic materials, e.g. silicon dioxide, or organic materials e.g. synthetic resins, of suitable properties may be used. The invention may be employed to make sheets of various thicknesses, e.g. comparatively thick plates or comparatively thin films.

The fluid is conveniently water or another suitable liquid or mixture of liquids of desired specific gravity.

The backing or support is preferably permeable to the fluid. Fluid and excess suspended particles may be drained away from above the layer after the layer has attained a desired thickness, while suction or a negative pressure is maintained below the permeable backing or support to cause fluid to flow down through the layer and the backing and support. By suitable control of the time of deposition before draining it is possible to obtain a sheet of uniform high porosity even when the starting material contains a substantial amount of fines.

The backing or support is preferably flexible so that it can be stripped or peeled from the layer at a suitable time. It preferably comprises a fibrous mat of non-woven organic material, e.g. cellulosic fibres. The mat should have a surface with a minimum of projecting fibres or fluff which would become embedded in the layer and prevent peeling off of the mat without damage to the layer.

After deposition, the layer may be subjected to a pressing operation and thereafter to heat treatment to induce or promulgate sintering.

The invention also provides apparatus for the manufacture of sheets of sintered material comprising a vessel for containing a suspension of particles of sinterable material in a fluid, a permeable diaphragm for supporting a backing or support so that particles can be deposited thereon in a layer, and means for draining suspension from the vessel from above and below said layer.

Figure 1:
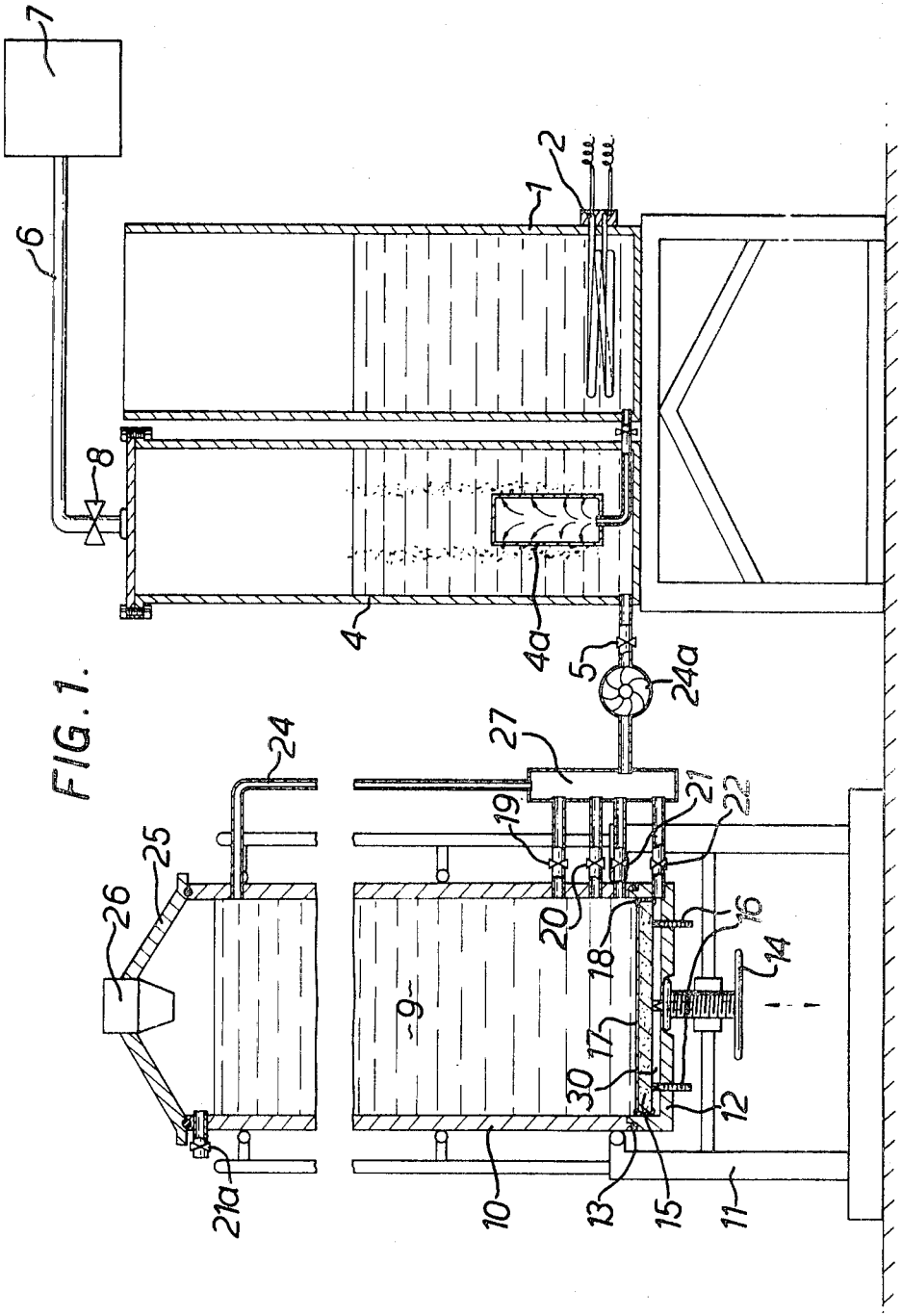
Figure 2:
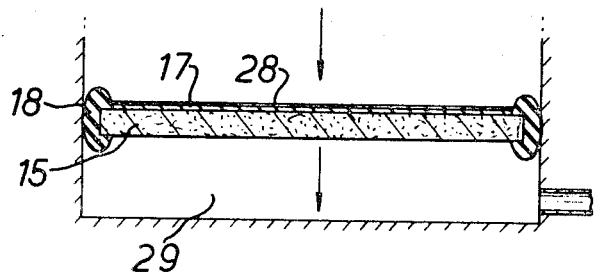
Figure 3:
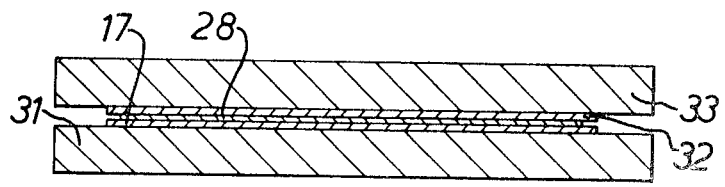
Figures 4A, 4B:
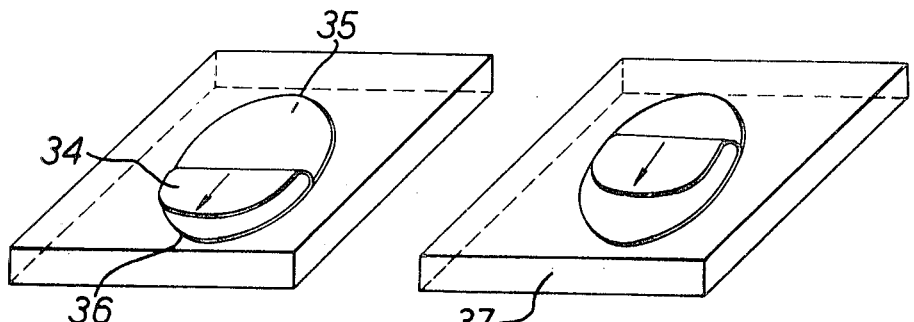
Figure 5:
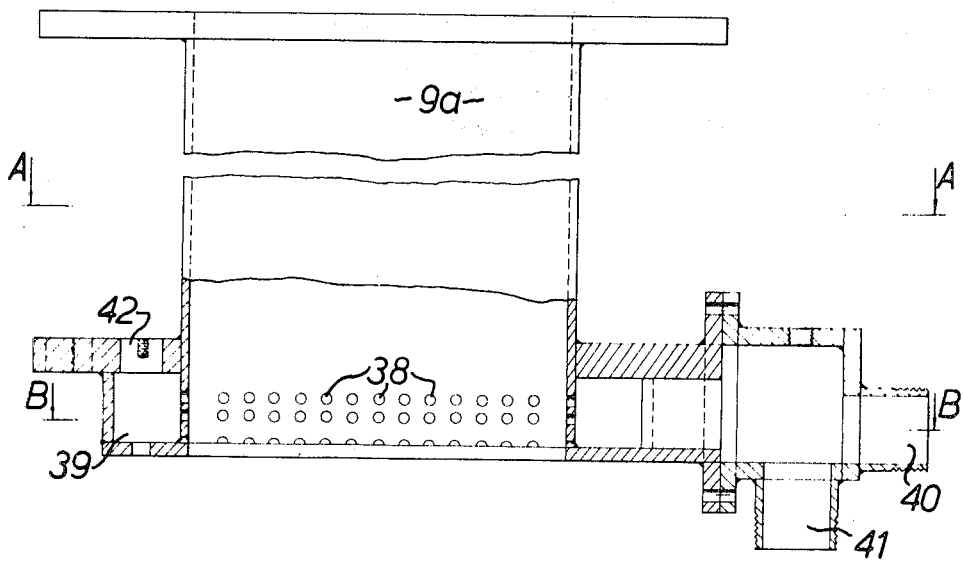
Figure 6:
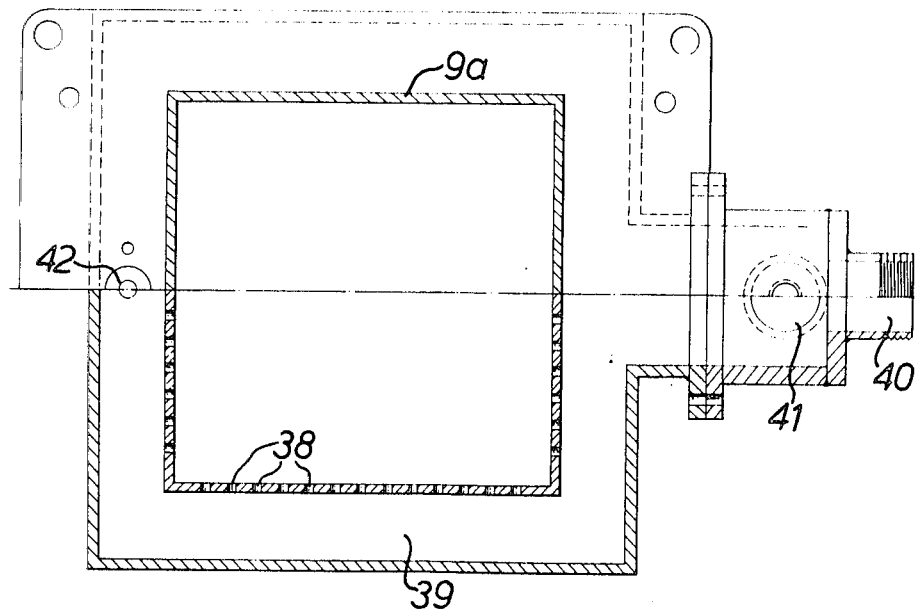
Figure 7:
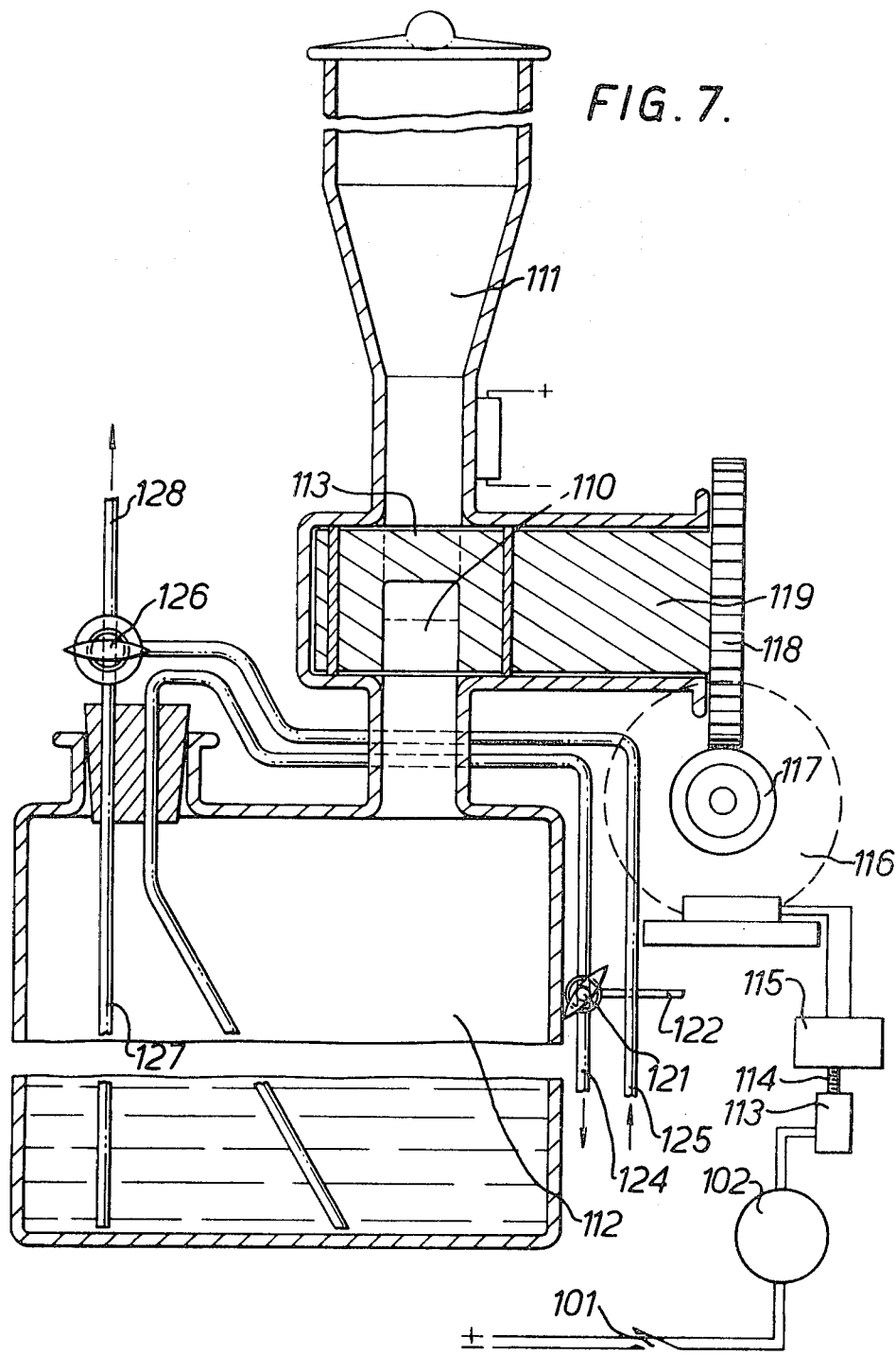

The following is a description, by way of example, of embodiments of the invention, reference being made to the accompanying diagrammatic drawings, in which:

FIG. 1 is a sectional elevation of apparatus for making porous sheets of sintered material in accordance with the invention, FIG. 2 is a section through the part of the apparatus where the layer is formed, FIG. 3 is a sectional view showing how the layer is prepared for pressing, FIG. 4(*a*) and 4(*b*) show a flexible backing or support being stripped off after pressing of the layer and before heat treatment, FIG. 5 is a part-sectional elevation through a modified form of deposition chamber, FIG. 6 is a sectional view on lines AA and BB in FIG. 5, and FIGS. 7 and 8 are sectional elevations of a dosimeter for supplying particulate material.

Referring to the drawings, a cylindrical container 1 is filled with de-ionised water and, by means of a heating unit 2 the water is raised to a temperature of not less than 140° F. A tap or valve 3 is then opened and the preheated water allowed to flow into a de-aeration container 4 via a porous diffuser cylinder 4*a*. The flow of water into the container 4 is assisted, and de-aeration commenced by shutting an outlet tap or valve 5, opening a tap or valve 8 in a pipe line 6 which is connected to a vacuum pump and applying sub-ambient pressure to the vessel above the water level. As the water diffuses through the walls of the diffuser cylinder rapid de-aeration of the water takes place, the gases being exhausted via the vacuum line 6.

It should be noted that the term de-aeration means the removal of those gases particularly oxygen, normally dissolved in water which occurs when water is subjected to reduced pressure at a temperature of not less than 140° F. When the container 4 is filled to the desired level and de-aeration effected, the valves 8 and 3 are restored to the closed position.

A deposition chamber 9 is then prepared for use. This chamber comprises an open-ended tube 10 made from a suitable transparent or translucent ceramic or plastic material, for example acrylic resin, supported in a vertical position by a suitable framework 11. The lower end of the tube 10 is precision machined to accept a recessed terminal plate or plug 12 which is brought into firm engagement with a sealing ring 13 by means of a manually operated screw 14 to effect a watertight seal. Prior to carrying out the above described step in assembly of the plate 12, a circumferentially gasketed, permeable and corrosion-resistant diaphragm 15, e.g. a porous sintered bronze plate or a cellular rigid plastic plate, is placed on glanded supporting screw columns 16 carried by the plate 12. A circular mat or web 17 of non-woven cellulosic fibres is dampened with de-ionised water and them placed on the upper surface of the porous plate 15, the diameter of the mat 17 being such that it precisely fits within the internal circumference of a gasket ring 18 round the plate 15 and masks off the upper surface of the plate 15. The supporting screw columns 16 are manually adjusted until the plate 15 is level, whereupon the entire lower assembly is raised into engagement with the bottom of the tube 10, and made watertight by means of the screw 14.

Drainage taps, 19, 20, 21 and 22 at different levels in the tube 10 are closed, the valve 5 is opened and the requisite volume of heated and de-aerated water admitted to the deposition chamber 9 by a supply line 24 via a pump 24a, the water cascading onto a removable baffle (not shown) to prevent disturbance of the cellulosic mat 17.

An airtight cover 25, incorporating a mechanical particle feeding unit 26 is then placed in position at the upper end of the tube 10. The unit 26 is such that, in a given time cycle, it is capable of dispersing selected increments of the desired particulate sinterable material in the water contained within the chamber 9. The incremental addition of the material to the water in the deposition chamber is of great importance, ensuring adequate wetting of the individual particles. In addition it assures adequate time and opportunity for the fines to avoid entrainment with larger particles. Having added the whole of the particulate material to the deposition chamber 9, uniform settlement and thickness of the layer deposited upon the cellulosic mat 17 are now important. A longer period is required for the smaller particles to settle than for the larger particles. The time permitted for settlement of the aqueous suspension is influenced by:

a) The height and diameter of the column of water in the deposition chamber.
b) The uniformity of temperature within the aqueous suspension.
c) The overall range of particle size within the total volume of particles.
d) The ratio of fine, intermediate, and coarse particles within a given range of particle size.
e) The efficiency and speed of the means used to effect complete wetting of the particles.

The optimum value of settling time is critical because if too high a percentage of fines is permitted to settle, this will result in severe reduction in the degree of porosity. Therefore, the actual value is obtained by calibration, to allow for the specific characteristics of the apparatus as designed, but may require to be adjusted to meet the different specifications of porous sheet.

Having allowed the requisite lapse of time, a major part of the water and suspended fines is drawn off, by opening the taps 19 and 22 under vacuum to the container 4 via a manifold 27 the vacuum line tap 8 being opened. As required, air at atmospheric pressure is permitted to enter the chamber 9 via a tap 21a, to maintain the requisite equilibrium as the suspension is drained off. When the contents of the deposition chamber 9 have reached the level of the tap 19, this tap is enclosed and tap 20 opened at the next lower out-flow level and, if necessary the out-flow of water is reduced to minimise any risk of turbulence in the remaining suspension. At the appropriate point in time this operation is repeated via the out-flow tap 21. The number and position of the out-flows or draw-off points is purely a matter of choice provided that turbulence is avoided and provided an out-flow tap 22 is arranged below the plate 15. Once deposition has commenced on the mat 17, the particle layer is, at all times, maintained at a negative pressure on its undersurface i.e. negative pressure must at all times be maintained within the void 29 FIG. 2, to ensure that the supporting mat 17, and the deposited layer, are held in uniform and level contact with the upper surface of the porous plate 15. Alternatively, provided the water is kept in hydrostatic balance throughout the deposition cycle, negative pressure may be applied to the underside of the mat during only the final stages of removing the water from the deposition chamber.

Having completed the deposition cycle and drawn off the water and the remaining "fines," the bottom of the deposition chamber 9 is lowered by the screw 14 to give access to the porous plate 15 and the overlying laminate of support mat and deposited layer.

Using the mat 17 as a flexible support, the deposited layer 28 is peeled off the plate 15 and the mat is laid on a polished plate of plastics material 31 (FIG. 3). A second water dampened cellulosic mat 32 is placed on top of the layer 28 followed by a second plastics plate 33. The whole is then subjected to pressing (if desired by rolling). This pressing operation employs only the minimal pressure necessary to cold weld the particulate material forming the deposited layer and, when correctly performed, imparts added mechanical strength to the "green pressing," to aid subsequent handling prior to heating, without any significant reduction of the porous structure within the sheet thus formed. Upon completion of the pressing operation, the laminate of cellulosic mats and pressed sheet are treated in the following manner.

The upper plastics plate 33 is removed and the exposed upper cellulosic mat 34 peeled off by raising one edge and steadily drawing it back to its diametrically opposite edge (FIG. 4(a) and FIG. 4(b)) thus exposing one face of the pressed sheet 35. The sheet 35 is lifted by means of the underlying cellulosic mat 36 and transferred to a carbon plate 37 with the sheet 35 in contact with the carbon plate. The remaining cellulosic mat is then stripped in the manner already described. The pressed "green" sheet is uniformly sprayed with a hydrocarbon wax dispersed in a suitable solvent, to retard or prevent oxidation and, additionally, provide a neutral atmosphere during the subsequent heating operation. A second carbon plate is placed over the first one, sandwiching the "green" pressing, and the whole is heated in a neutral or full reducing atmosphere in any suitable type of furnace to induce or promulgate sintering.

FIGS. 5 and 6 show a modified form of deposition chamber 9a which has adjacent its bottom and around its whole periphery a plurality of perforations 38 at different levels above the level which will be occupied by the diaphragm 15. A header or passageway 39 extends around the chamber 9a at its lower end, communicating with the perforations 38, and this header is provided with a water inlet and outlet 40, 41 and an air vent opening 42 adapted to be fitted with a suitable valve. The water is admitted to and drained from the deposition chamber through the header 39 and the perforations 38, the arrangement minimising turbulence in the entering and departing liquid. The chamber 9a is of square cross-section for the production of square sintered sheets.

Instead of the feeding unit 26, a dosimeter as shown in FIGS. 7 and 8 may be used for feeding the particulate material into the deposition chamber. The dosimeter can automatically feed, at timed intervals, the requisite volume or weight of dry particulate material from a reservoir, via a measuring device, to a pre-mixing chamber. Upon entry into the said chamber the powder will mix with deionised water—circulating through the chamber on a closed circuit via a peristaltic or similar type of pump—to form a slurry. The resultant slurry can, by means of a suitable dispersal device and by changing its flow route, be injected as increments or entirely into the top of the deposition chamber. The method of operation is as follows:

An electrical supply is connected via a switch 101 to a variable timing device 112 which allows the passage of current, at predetermined intervals, to motivate a fractional horse power motor 113, rotating a shaft 114 and driving a commutator 115. The segments of the commutator 115 are so disposed that one revolution of the commutator supplies sufficient current to a motor 116 to allow a worm 117 to turn a gearwheel 118 and a shaft 119 attached thereto, one complete revolution. During this operation a measuring cavity 110—which is machined out of the shaft 119—has filled with particulate material from a feed hopper 111, moved round to a discharge position, discharged the particulate material by gravity into a pre-mix chamber 112 and returned to the charge position 113. Here, rotation is conjointly arrested by the commutator 115 and the timing device 112, until the next injection cycle is motivated. The measured quantity of particulate material which has been discharged into the pre-mix chamber 112 is admixed with deionised water therein, and brought to and maintained in a state of suspension by circulation along a closed circuit represented by pipes 124 and 125 and 127 and a two-way tap or valve 126, into which is incorporated a peristaltic or similar type of pump (not shown). At the appropriate time, when the slurry is to be injected into the deposition chamber, the tap 126—which may be operated manually or integrated into the time electrical circuitry—is turned to terminate the flow of slurry through the pipe 125 and re-direct its path, so that the contents of the chamber 112 are completely discharged via pipes 127 and 128 to a dispersion head 129 (see FIG. 8) located just below the water level in the disposition chamber 9. When the slurry has been completely discharged from the chamber 112, the tap 126 is returned to its former position to establish, once again, free flow between the pipes 125 and 127 for re-enactment of the cycle. Rotation of the tap 121 brings a fresh supply of deionised water into the chamber 112 from a header tank (not shown) via a pipe 122. Tap 121 may also be integrated into the timing circuitry as described for tap 126.

While water is normally preferred as the suspending medium, other liquids or mixtures of liquids may be used, for example if the particulate material has a specific gravity of less than 1.0, a liquid or mixture having a lower specific gravity must be employed. Also to prevent the excessive entrainment of "fines" or, alternatively, give the "fines" sufficient time to agglomerate before deposition, the rate of fall of a given particulate material may need to be increased or decreased according to the height of the deposition chamber. Variation of the specific gravity of the liquid could assist in controlling the rate of fall. Wetting agents may advantageously be dissolved in the liquid.

In the past numerous methods and techniques have been employed to deposit metallic particulate plates and films which are subsequently pressed and sintered to provide the final product.

However, due to one or more of the undermentioned deficiencies, the said products have largely failed to meet the more exacting commercial specifications, especially those relating to energy conversion projects:

(1) Insufficient porosity.
(2) Inconsistent porosity over a given surface area.
(3) Inconsistent porosity within a given cubic mass.
(4) Inability to produce a sufficiently thin plate or film possessing complete homogeneity of cellular structure.
(5) Inability to produce a plate or film, of any appreciable surface area, having a very small yet consistent thickness.
(6) Poor response to mechanical forming and similar operations due to limited ductility and flexibility.

The foregoing difficulties and deficiencies may be mitigated or overcome by use of the apparatus and method described with reference to the accompanying drawings, which apparatus and method can be used to produce a porous sheet having the following characteristics:

(a) Increased and, hence, efficiency in certain chemical engineering requirements, to the extent of a porosity of some 60% plus.
(b) A more consistent product quality-wise than hitherto available, particularly with respect to plates or films of the order of 0.005" and less in thickness.
(c) Increased flexibility in the sintered product, in some cases to the extent that a strip can be repeatedly "rolled on and rolled off" smaller diameter mandrels than hitherto possible.

Apparatus as shown in the drawings may, for example, be used as hereinbefore described to make porous sheets from commercially-available nickel powder produced from nickel carbonyl.

Experiments have indicated that with this nickel powder, which contains particles of various sizes, deposition may occur as follows:

(a) The larger sized particles, which have an irregular, almost dendritic, configuration, are deposited first to produce a film having high porosity.
(b) A considerable proportion of the intermediate sized particles do not, as might have been expected, remain as separate particles with a slower rate of settlement than the larger particles. They tend to undergo agglomeration until the mass of each agglomerate is approximately that of larger sized particles and the agglomerates settle at a corresponding rate.
(c) The "fines" are of such a size that they exhibit, or nearly exhibit Brownian motion. Consequently they require a greatly increased period of time for even partial settlement.

The deposition of only the larger sized particles and the agglomerates under (a) and (b) results in a product of comparatively high porosity and uniformity as hereinbefore described. However, it will be evident that the process may be used to produce sheets with a porosity which varies through the thickness of the sheets. For example, the nickel powder as supplied could be subjected to an initial separation treatment to separate the "fines" from the larger sized and intermediate particles. The deposition apparatus could then be supplied with a charge of "fines" to produce a layer of "fines", followed by a charge of larger sized and intermediate particles, and, if later required, a further charge of "fines". Thus, a sheet could be made having surface layers of comparatively low porosity and a middle layer of comparatively high porosity. Alternatively, the deposition sequence could be varied to produce a film or sheet having comparatively high surface porosity and comparatively low internal porosity. Particulate material other than nickel could of course be used in a similar way to produce a sheet of varying porosity provided that the material had a suitable range of particle sizes.

I claim:

1. A method of manufacturing porous sheets of sintered material, which method includes the steps of forming a suspension of particles of sinterable material in a liquid, depositing the particles from the suspension to form a layer on top of a permeable support while liquid is removed through said permeable support, removing liquid and particles suspended therein from above said layer during deposition of the particles to control the characteristics of the layer, and sintering the particles in the layer to form a coherent porous sheet.

2. A method according to claim 1, in which the particles of sinterable material are dispersed in the liquid by a mechanical particle feeding unit in selected increments.

3. A method according to claim 1, in which the particles of sinterable material are dispersed in the liquid by means of a dosimeter which automatically feeds, at timed intervals, the requisite volume or weight of dry particulate material from a reservoir by way of a measuring device to a pre-mixing chamber to form a slurry which is subsequently injected into the top of a deposition chamber containing liquid and the particles suspended therein.

4. A method according to claim 1, in which, after formation of the layer, the support is peeled away therefrom, the layer is pressed and then heated to produce said sheet.

5. A method according to claim 4 wherein the support comprises a fibrous mat of non-woven organic material.

6. A method according to claim 4 wherein the mat comprises cellulosic fibres.

7. A method according to claim 4, in which the layer is placed between carbon blocks to prevent distortion during sintering.

8. A method of manufacturing porous sheets of sintered material, which method includes the steps of forming a suspension of particles of sinterable material in a liquid column disposed above a permeable support, drawing liquid through said permeable support to assist the deposition under gravity of the particles in the suspension to form a layer on top of the permeable support, controlling the characteristics of the layer by removing liquid and particles suspended therein from above said layer during deposition of the particles, pressing said layer to give it a degree of coherence, and heating said layer to sinter the particles to form a coherent sheet.

9. A method according to claim 8, in which the liquid and particles suspended therein are drawn off from above the permeable support progressively through outlets arranged at different levels above the permeable support.

References Cited

UNITED STATES PATENTS

| | | | |
|---|---|---|---|
| 3,431,332 | 3/1969 | Cummings | 264—86 |
| 2,947,056 | 8/1960 | Csordas et al. | 264—125 |
| 1,845,775 | 2/1932 | Zavertnik et al. | 117—119 |

OTHER REFERENCES

In Steel, New Opportunities for Metalworking, Aug. 10, 1959, pp. 126–128.

ALFRED L. LEAVITT, Primary Examiner

M. F. ESPOSITO, Assistant Examiner

U.S. Cl. X.R.

75—200, 206, 222, 225; 117—119, 160; 264—86, 125